(12) United States Patent
Wada et al.

(10) Patent No.: US 11,886,006 B2
(45) Date of Patent: Jan. 30, 2024

(54) POLYMER OPTICAL WAVEGUIDE AND COMPOSITE OPTICAL WAVEGUIDE

(71) Applicant: AGC Inc., Tokyo (JP)

(72) Inventors: Naoya Wada, Tokyo (JP); Shotaro Takenobu, Tokyo (JP); Kenta Kobayashi, Tokyo (JP); Seiki Ohara, Tokyo (JP)

(73) Assignee: AGC Inc., Tokyo (JP)

( * ) Notice: Subject to any disclaimer, the term of this patent is extended or adjusted under 35 U.S.C. 154(b) by 65 days.

(21) Appl. No.: 17/453,906

(22) Filed: Nov. 8, 2021

(65) Prior Publication Data

US 2022/0057574 A1 Feb. 24, 2022

Related U.S. Application Data

(63) Continuation of application No. PCT/JP2020/018271, filed on Apr. 30, 2020.

(30) Foreign Application Priority Data

May 9, 2019 (JP) ................................. 2019-088978

(51) Int. Cl.
*G02B 6/122* (2006.01)
*G02B 6/02* (2006.01)

(52) U.S. Cl.
CPC ....... *G02B 6/1221* (2013.01); *G02B 6/02038* (2013.01)

(58) Field of Classification Search
None
See application file for complete search history.

(56) References Cited

U.S. PATENT DOCUMENTS

2012/0175794 A1\* 7/2012 Takase ................. G02B 6/1221
264/1.27
2014/0112616 A1 4/2014 Numata
(Continued)

FOREIGN PATENT DOCUMENTS

JP 2004-085937 A 3/2004
JP 2011-001431 A 1/2011
(Continued)

OTHER PUBLICATIONS

International Search Report dated Jul. 28, 2020 in PCT/JP2020/018271 filed on April 30, 2020, 2 pages.

*Primary Examiner* — Chris H Chu
(74) *Attorney, Agent, or Firm* — Oblon, McClelland, Maier & Neustadt, L.L.P.

(57) ABSTRACT

The present invention provides a polymer optical waveguide having a core, an under cladding and an over cladding, in which: the polymer optical waveguide has a first section on one end side in the light propagation direction where no portion of the over cladding exists and the core and the under cladding are exposed, and a second section on the other end side in the light propagation direction where the core is covered with the under cladding and the over cladding; and a relative refractive index difference among the core, the under cladding and the over cladding, a core width and core height in an end surface at the one end side of the first section, and a core width and core height in an end surface at the other end side of the second section satisfy predetermined relationships.

10 Claims, 7 Drawing Sheets

(56) References Cited

U.S. PATENT DOCUMENTS

| | | | |
|---|---|---|---|
| 2016/0103279 A1* | 4/2016 | Budd | G02B 6/12004 |
| | | | 438/31 |
| 2016/0131837 A1* | 5/2016 | Mahgerefteh | G02B 6/126 |
| | | | 385/14 |
| 2018/0156970 A1* | 6/2018 | Ohara | G02B 6/26 |
| 2019/0072721 A1* | 3/2019 | Horibe | C09J 7/22 |

FOREIGN PATENT DOCUMENTS

| | | |
|---|---|---|
| JP | 2014-081586 A | 5/2014 |
| WO | WO 2018/168783 A1 | 9/2018 |

* cited by examiner

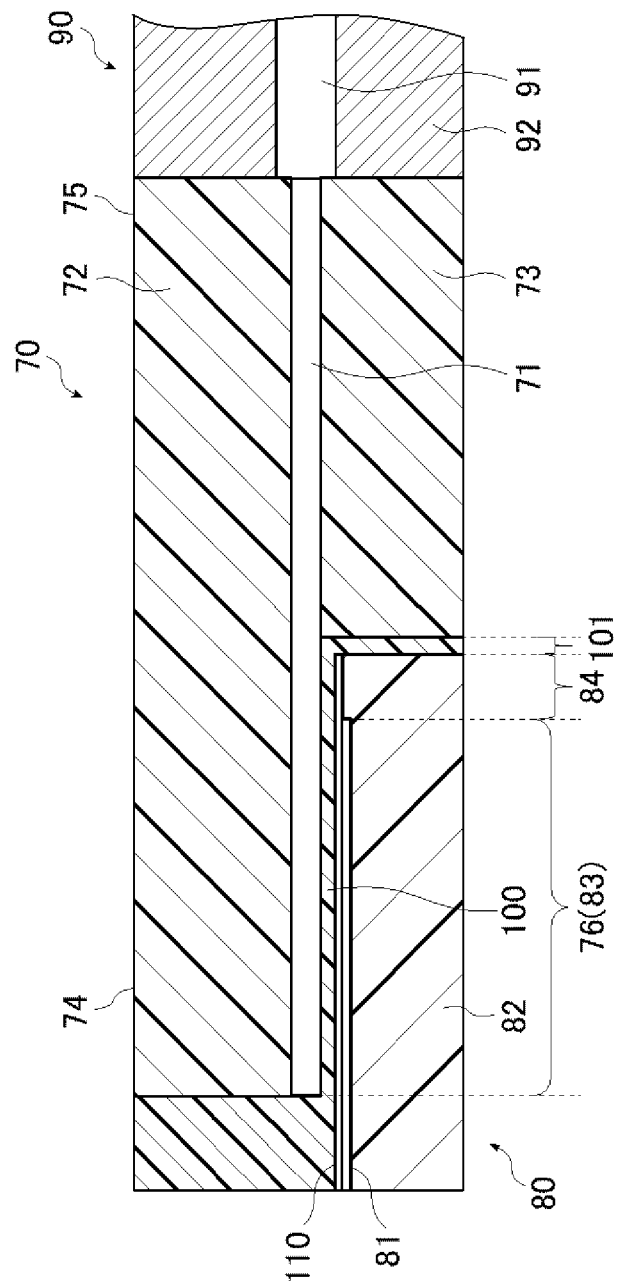

POLYMER OPTICAL WAVEGUIDE AND COMPOSITE OPTICAL WAVEGUIDE

TECHNICAL FIELD

The present invention relates to a polymer optical waveguide and a composite optical waveguide.

BACKGROUND ART

Silicon photonics, which is a technique for integrating silicon optical circuits on a silicon chip, has attracted attention. In silicon photonics, polymer optical waveguides utilizing adiabatic coupling are known as waveguides that transmit an optical signal between a silicon optical waveguide formed in an optical integrated circuit and an optical fiber (refer to, e.g., Patent Document 1). When the polymer optical waveguide is used, a propagation loss between a silicon optical waveguide and an optical fiber can be lowered.

However, even in the case where the polymer optical waveguide of Patent Document 1 is used, the degree of lowering of the propagation loss between the silicon optical waveguide and the optical fiber is not sufficient; and it is desired to connect a silicon optical waveguide and an optical fiber with an even lower loss.

In connecting a polymer optical waveguide and a silicon optical waveguide to each other or in connecting a polymer optical waveguide and an optical fiber to each other, they are not always in an ideal relative positional relationship and there may occur a case that they have a positional deviation (offset) of about 2 pam. In this specification, the expression "offset of about 2 μm" means an offset that is 1 μm or larger and 3 μm or smaller.

The offset of about 2 μm may occur in either one or of both a connection portion between the polymer optical waveguide and the silicon optical waveguide and a connection portion between the polymer optical waveguide and the optical fiber.

Thus, a connection loss being small in the case of an ideal positional relationship is insufficient as a performance desired; in implementation, it is desired to lower the connection loss that occurs in the case of an offset of 2 μm or smaller.

CITATION LIST

Patent Literature

Patent Document 1: JP-A-2014-81586

SUMMARY OF INVENTION

Object to be Attained by Invention

To solve the above problem in the art, an object of the present invention is to provide a polymer optical waveguide capable of realizing adiabatic coupling with a silicon optical waveguide and butt (confronting) coupling with an optical fiber with a small loss even in the case of an offset of 2 μm or smaller.

Solution to Problem

To attain the above object, a polymer optical waveguide according to the present invention has the following configuration:

A polymer optical waveguide having a core, an under cladding that is lower in refractive index than the core and is located adjacent to the core, and an over cladding that is located adjacent to the core on the side opposite to the under cladding, in which:

the polymer optical waveguide has a first section and a second section along a light propagation direction, the first section is a section on one end side in the light propagation direction where no portion of the over cladding exists and a portion of the core and a portion of the under cladding adjacent to that portion of the core are exposed, and the second section is a section on the other end side in the light propagation direction where a portion of the core is covered with the under cladding and the over cladding;

a relative refractive index difference D (%) defined by the following Equation (i) is 0.6 or larger;

k defined by the following Equation (ii) is 7.5 or larger and 11.5 or smaller;

$Ws/Hs$ is 1.50 or larger and 6.00 or smaller;

$Ws/Wf$ is 1.20 or larger; and $Wf+Hf$ is 2.6 or larger: D (%)=100×[(core refractive index)−{(under cladding refractive index)+(over cladding refractive index)}/2]/[{(under cladding refractive index)+(over cladding refractive index)}/2]Equation (i) k=5D+Wf+Hf Equation (ii) where Ws (μm) is a core width in an end surface s at the one end side of the first section, Hs (μm) is a core height in the end surface s, Wf (μm) is a core width in an end surface f at the other end side of the second section, and Hf (μm) is a core height in the end surface f.

In the polymer optical waveguide according to the present invention, the relative refractive index difference D is preferably 0.6 or larger and 1.7 or smaller.

In the polymer optical waveguide according to the present invention, Ws/Wf is preferably 1.20 or lager and 10.00 or smaller.

In the polymer optical waveguide according to the present invention, Wf+Hf is preferably 2.6 or larger and 8.5 or smaller.

In the polymer optical waveguide according to the present invention, the core is preferably made of a polymer containing fluorine.

The polymer optical waveguide according to the present invention is preferably a single mode optical waveguide.

The present invention also provides a composite optical waveguide containing the polymer optical waveguide according to the present invention and a connector that houses the second section of the polymer optical waveguide.

Advantageous Effect of Invention

The polymer optical waveguide according to the present invention can realize adiabatic coupling with a silicon optical waveguide and butt (confronting) coupling with an optical fiber with a small loss even in the case of an offset of 2 μm or smaller.

BRIEF DESCRIPTION OF DRAWINGS

FIG. 8A to FIG. 8E are plan views of modified configuration examples of the polymer optical waveguide.

FIG. 9 is a horizontal sectional view of an evaluation model that was used for a simulation analysis.

DESCRIPTION OF EMBODIMENTS

Figure 1:
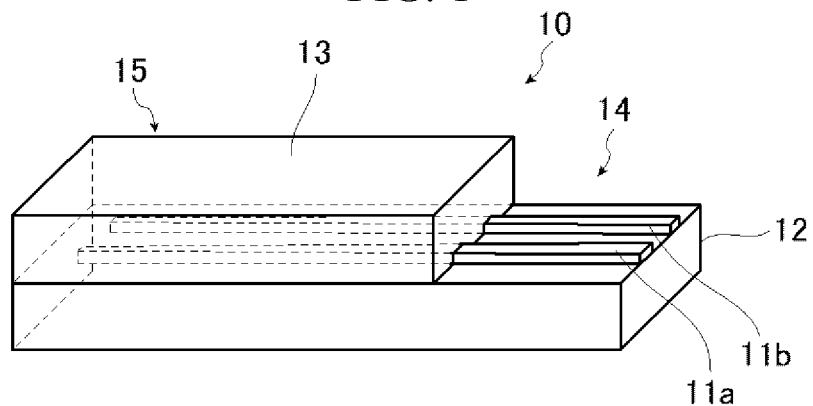
FIG. 1 is a perspective view illustrating a configuration example of a polymer optical waveguide according to the present invention.

The present invention will be hereinafter described with reference to the drawings. FIG. 1 is a perspective view illustrating a configuration example of a polymer optical waveguide according to the present invention. The polymer optical waveguide 10 illustrated in FIG. 1 is equipped with two cores 11a and 11b, an under cladding 12 that is lower in refractive index than the cores 11a and 11b and is located adjacent to the cores 11a and 11b, and an over cladding 13 that is located adjacent to the cores 11a and 11b on the side opposite to the under cladding 12.

The polymer optical waveguide 10 has, on one end side (right side in the figure) in the light propagation direction, a first section 14 where no portion of the over cladding 13 exists and portions of the cores 11a and 11b and portions of the under cladding 12, adjacent to those portions of the cores 11a and 11b, are exposed. The first section 14 is used as an adiabatic coupling section to be coupled with a silicon optical waveguide.

On the other hand, the polymer optical waveguide 10 has, on the other end side (left side in the figure) in the light propagation direction, a second section 15 where portions of the cores 11a and 11b are covered with the under cladding 12 and the over cladding 13. The second section 15 is used as a butt (confronting) coupling section to be coupled with single-mode optical fibers.

Figure 2:
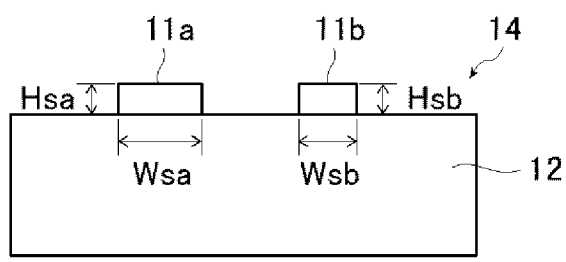
FIG. 2 is a view illustrating an end surface s on the side of a first section 14 of the polymer optical waveguide 10 illustrated in FIG. 1.

FIG. 2 is a view of an end surface s on the one end side (right side in the figure) of the first section 14.

In FIG. 2, core widths of the cores 11a and 11b in the end surface s are represented by Wsa (μm) and Wsb (μm), respectively. Core heights of the cores 11a and 11b in the end surface s are represented by Hsa (μm) and Hsb (μm), respectively.

Figure 3:
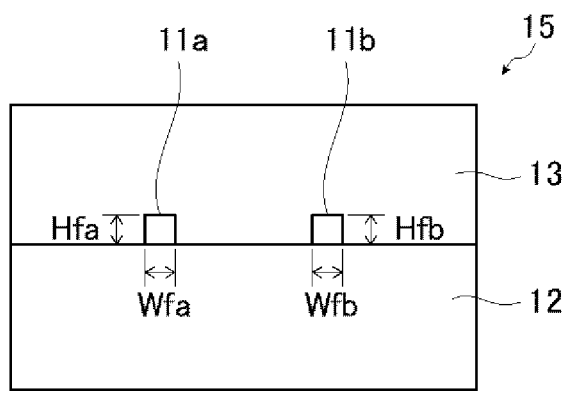
FIG. 3 is a view illustrating an end surface f on the side of a second section 15 of the polymer optical waveguide 10 illustrated in FIG. 1.

FIG. 3 is a view of an end surface f on the other end side (left side in the figure) of the second section 15.

In FIG. 3, core widths of the cores 11a and 11b in the end surface f are represented by Wfa (μm) and Wfb (μm), respectively. Core heights of the cores 11a and 11b in the end surface f are represented by Hfa (μm) and Hfb (μm), respectively.

In the polymer optical waveguide 10 illustrated in FIG. 1 to FIG. 3, the two cores 11a and 11b are arranged parallel with each other so as to extend along the light propagation direction of the cores in the polymer optical waveguide 10 (in this specification, thereinafter referred to as a "light propagation direction in the polymer optical waveguide"). However, the number of cores in the polymer optical waveguide according to the present invention is not limited to this number and may be one or three or more. The number of cores is preferably an even number; even preferably 8, 12, 16, or 24, for example.

The polymer optical waveguide according to the present invention can realize adiabatic coupling with a silicon optical waveguide and butt (confronting) coupling with an optical fiber with a small loss even in the case of an offset of 2 μm or smaller in the case where the following conditions 1-5 are satisfied.

(Condition 1)

In the polymer optical waveguide 10 according to the present invention, the ratios of the core widths Wsa and Wsb to the core heights Hsa and Hsb of the respective cores 11a and 11b in the end surface s (i.e., Wsa/Hsa and Wsb/Hsb) should be 1.50 or larger and 6.00 or smaller. In the case where the ratio of the core width Ws to the core height Hs in the end surface s (i.e., Ws/Hs) is in the above range, adiabatic coupling with a silicon optical waveguide and butt (confronting) coupling with an optical fiber can be realized with a small loss even in the case of an offset of 2 μm or smaller. In the case where Ws/Hs is out of the above range, that is, Ws/Hs is smaller than 1.50 or larger than 6.00, the connection loss in the case of an offset of about 2 μm is increased. Ws/Hs is preferably 1.80 or larger and 5.00 or smaller, and even preferably 2.00 or larger and 3.50 or smaller.

(Condition 2)

In the polymer optical waveguide 10 according to the present invention, the ratios of the core widths Wsa and Wsb of the respective cores 11a and 11b in the end surface s to the core widths Wfa and Wfb of the respective cores 11a and 11b in the end surface f (i.e., Wsa/Wfa and Wsb/Wfb) should be 1.20 or larger. In the case where the ratio of the core width Ws in the end surface s to the core width Wf in the end surface f (i.e., Ws/Wf) is 1.20 or larger, adiabatic coupling with a silicon optical waveguide and butt (confronting) coupling with an optical fiber can be realized with a small loss even in the case of an offset of 2 μm or smaller. Furthermore, since a portion where the core width is small and the aspect ratio of a core sectional shape is large is made small, the yield of manufacture of the polymer optical waveguide is increased. In the case where Ws/Wf is out of the above range, that is, Ws/Wf is smaller than 1.20, the connection loss in the case of an offset of about 2 μm may become very large.

Ws/Wf is preferably 1.50 or larger, and even preferably 1.80 or larger.

Ws/Wf being 10.00 or smaller is preferable because the connection loss in the case of an offset of 2 μm or smaller can be made small. Ws/Wf is even preferably 5.00 or smaller and further preferably 3.50 or smaller. Ws/Wf being 10.00 or smaller is preferable also because the polymer optical waveguide can be made compact, crosstalk (signal leakage) is not prone to occur, and the yield of manufacture of the polymer optical waveguide is increased since the core width difference does not become very large between the end surfaces s and f.
(Condition 3)

In the polymer optical waveguide 10 according to the present invention, the sum of the core width Wfa and the core height Hfa of the core 11a and the sum of the core width Wfb and the core height Hfb of the core 11b in the end surface f (i.e., Wfa+Hfa and Wfb+Hfb) should be 2.6 or larger. In the case where the sum of the core width Wf and the core height Hf in the end surface f (i.e., Wf+Hf) is 2.6 or larger, adiabatic coupling with a silicon optical waveguide and butt (confronting) coupling with an optical fiber can be realized with a small loss even in the case of an offset of 2 μm or smaller. Furthermore, since a portion where the core width is small and the aspect ratio of a core sectional shape is large is made small, the yield of manufacture of the polymer optical waveguide is increased. In the case where Wf+Hf is out of the above range, that is, Wf+Hf is smaller than 2.6, the connection loss in the case of an offset of about 2 μm may become very large. Wf+Hf is preferably 3.0 or larger, and even preferably 4.0 or larger.

Wf+Hf being 8.5 or smaller is preferable because the connection loss in the case of an offset of 2 μm or smaller can be made small. Ws+Hf is even preferably 7.5 or smaller and further preferably 6.0 or smaller. Wf+Hf being 8.5 or smaller is preferable also because the polymer optical waveguide can be made compact, crosstalk (signal leakage) is not prone to occur, the core shape can be controlled easily, and a single mode optical waveguide can be produced easily.

In the present invention, the relative refractive index difference D (%) is defined by the following Equation (i):

$$D(\%)=100\times[(\text{refractive index of core})-\{(\text{refractive index of under cladding})+(\text{refractive index of over cladding})\}/2]/[\{(\text{refractive index of under cladding})+(\text{refractive index of over cladding})\}/2]. \quad \text{Equation (i)}$$

The relative refractive index of the core 11a, Da (%), is defined by the following Equation (ia):

$$Da(\%)=100\times[(\text{refractive index of core } 11a)-\{(\text{refractive index of under cladding } 12)+(\text{refractive index of over cladding } 13)\}/2]/[\{(\text{refractive index of under cladding } 12)+(\text{refractive index of over cladding } 13)\}/2]. \quad \text{Equation (ia)}$$

The relative refractive index difference of the core 11b, db (%), is defined by the following Equation (ib):

$$db(\%)=100\times[(\text{refractive index of core } 11b)-\{(\text{refractive index of under cladding } 12)+(\text{refractive index of over cladding } 13)\}/2]/[\{(\text{refractive index of under cladding } 12)+(\text{refractive index of over cladding } 13)\}/2]. \quad \text{Equation (ib)}$$

In the case where a core has a refractive index distribution, its average refractive index is used as a representative refractive index. In the case where an under cladding or an over cladding has a refractive index distribution, an average refractive index of a region from the outer circumferential surface of a core to a depth of 5 μm is used as a representative refractive index.

The absolute value of a refractive index difference between the under cladding and the over cladding is preferably 0.001 or smaller, even preferably 0.0008 or smaller and further preferably 0.0006 or smaller.
(Condition 4)

In the present invention, the relative refractive index difference D (%) should be 0.6 or larger. In the case where the relative refractive index difference D is 0.6 or larger, adiabatic coupling with a silicon optical waveguide and butt (confronting) coupling with an optical fiber can be realized with a small loss even in the case of an offset of 2 μm or smaller. The relative refractive index difference D (%) being 0.6 or larger is preferable also because the bending loss of the polymer optical waveguide can be made small. In the case where The relative refractive index difference D is out of the above range, that is, D is smaller than 0.6, the connection loss in the case of an offset of about 2 μm may become very large. The relative refractive index difference D is preferably 0.7 or larger, even preferably 0.8 or larger.

The relative refractive index difference D being 1.7 or smaller is preferable because the connection loss in the case of an offset of 2 μm or smaller can be made small. The relative refractive index difference D is even preferably 1.4 or smaller and further preferably 1.2 or smaller. The relative refractive index difference D being 1.7 or smaller is preferable also because the composition of the cores becomes similar to the compositions of the under cladding and the over cladding and hence the adhesion between them is made stronger, and also because a single mode optical waveguide can be produced easily.
(Condition 5)

In the present invention, k that is defined by the following Equation (ii) should be 7.5 or larger and 11.5 or smaller:

$$k=5D+Wf+Hf. \quad \text{Equation (ii)}$$

In Equation (ii), D is the relative refractive index difference calculated in connection with the above-described condition 4 and Wf+Hf is the sum of the core width Wf and the core height Hf in the end surface f of the second section, calculated in connection with the above-described condition 3.

ka of the core 11a is defined by the following Equation (iia):

$$ka=5 Da+Wfa+Hfa. \quad \text{Equation (iia)}$$

kb of the core 11b is defined by the following Equation (iib):

$$kb=5db+Wfb+Hfb. \quad \text{Equation (ii)}$$

In the case where k is within the above range, adiabatic coupling with a silicon optical waveguide and butt (confronting) coupling with an optical fiber can be realized with a small loss even in the case of an offset of 2 μm or smaller. In the case where k is out of the above range, that is, k is smaller than 7.5 or larger than 11.5, the connection loss in the case of an offset of about 2 μm may become large. In the case where k is larger than 11.5, the propagation mode may become a multimode. The propagation mode is preferably a single mode because low-loss propagation can be attained. k is preferably 7.8 or larger and 10.5 or smaller, and even preferably 8 or larger and 9.5 or smaller.

Figure 4:
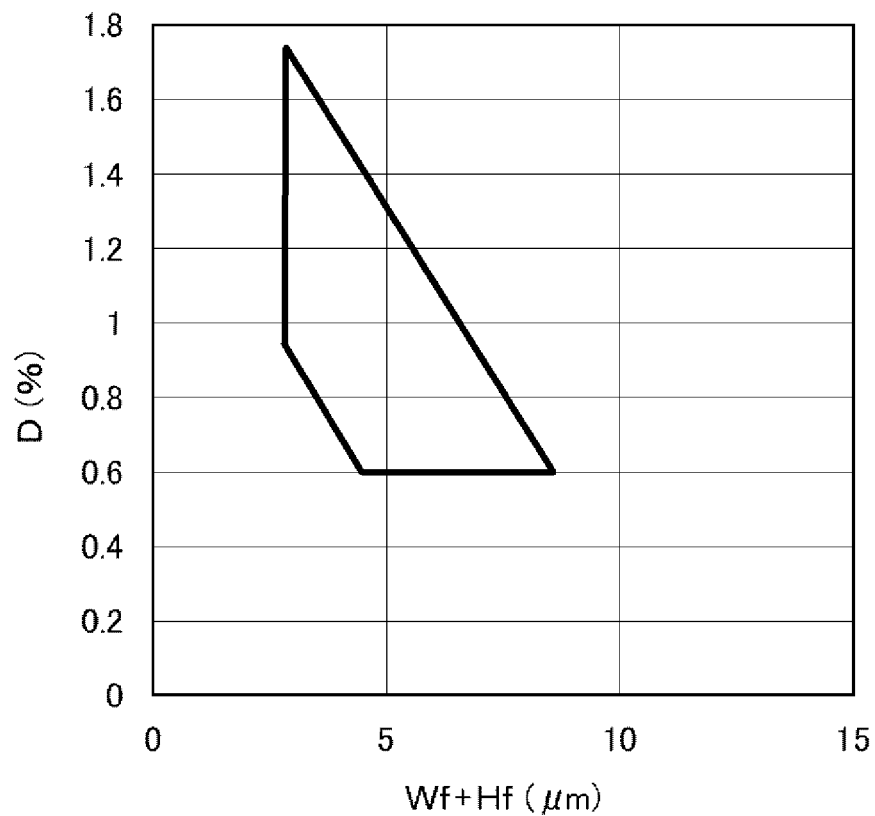
FIG. 4 is a graph showing a relationship between the sum, Wf+Hf, of a core width and a core height in an end surface f and the relative refractive index difference D.

FIG. 4 is a graph showing a relationship between the sum, Wf+Hf (μm), of the core width and the core height in the end surface f and the relative refractive index difference D (%). In the case where the condition 3, condition 4 and condition 5 are satisfied, this relationship of the polymer optical waveguide according to the present invention is within a range enclosed by a solid line in FIG. 4.

Figure 5:
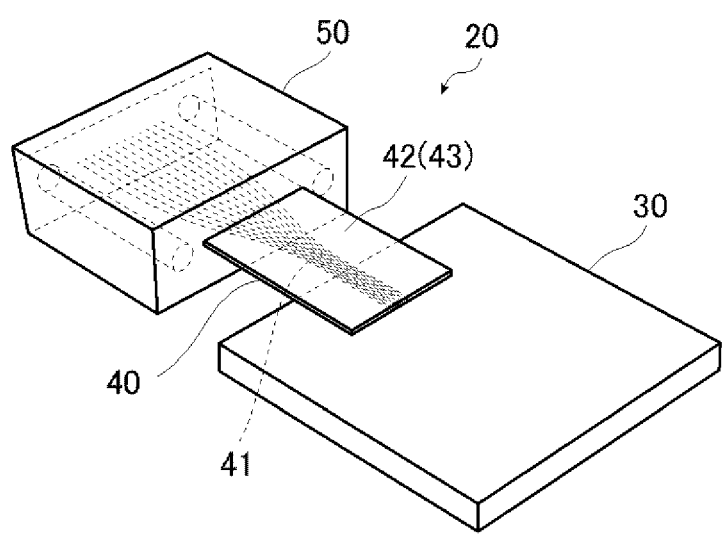
FIG. 5 is a perspective view illustrating one configuration example of a composite optical waveguide in which a polymer optical waveguide and a silicon optical waveguide are connected to each other by adiabatic coupling.
Figure 6:
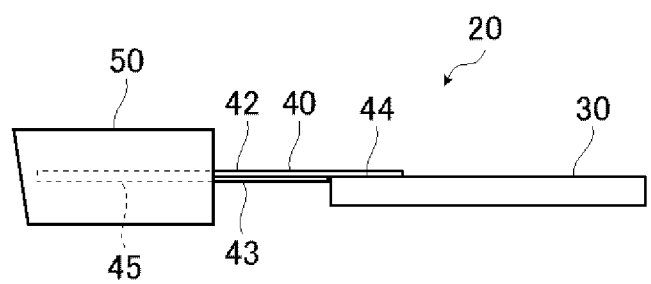
FIG. 6 is a side view of the composite optical waveguide 20 illustrated in FIG. 5.

FIG. 5 is a perspective view illustrating one configuration example of a composite optical waveguide in which a polymer optical waveguide according to the present invention and a silicon optical waveguide are connected to each other by adiabatic coupling. FIG. 6 is a side view of the composite optical waveguide 20 illustrated in FIG. 5. The configuration example of the polymer optical waveguide illustrated in FIG. 5 and FIG. 6 is different from that of the polymer optical waveguide illustrated in FIG. 1.

In the composite optical waveguide 20 illustrated in FIG. 5, the silicon optical waveguide 30 and the polymer optical waveguide 40 are connected to each other by adiabatic coupling. As in the polymer optical waveguide 10 illustrated in FIG. 1, the polymer optical waveguide 40 illustrated in FIG. 5 is equipped with cores 41, an under cladding 42, and an over cladding 43. Also as in the polymer optical waveguide 10 illustrated in FIG. 1, the polymer optical waveguide 40 illustrated in FIG. 5 has, on one end side (right side in the figure) in the light propagation direction, a first section 44 where no portion of the over cladding 43 exists and portions of the cores 41 and portions of the under cladding 42, adjacent to those portions of the cores 41, are exposed, and has, on the other end side (left side in the figure) in the light propagation direction, a second section 45 where portions of the cores 41 are covered with the under cladding 42 and the over cladding 43.

The first section 44 of the polymer optical waveguide 40 illustrated in FIG. 5 is connected to the silicon optical waveguide 30 by adiabatic coupling. The second section 45 of the polymer optical waveguide 40 is housed in a connector 50 for butt coupling (confronting coupling) with single mode optical fibers or the like.

Figure 7:
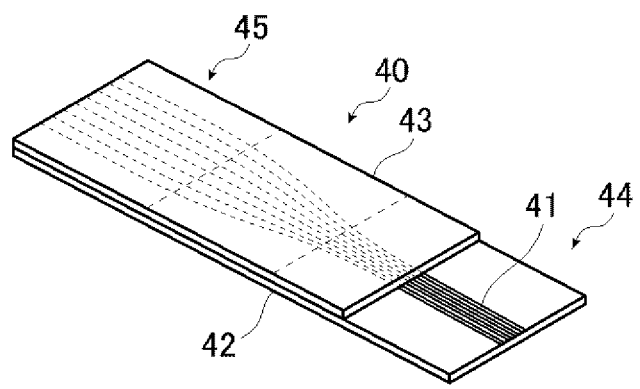
FIG. 7 is a perspective view of the polymer optical waveguide 40 illustrated in FIG. 5, but the polymer optical waveguide 40 is drawn upside down.
Figure 8A:
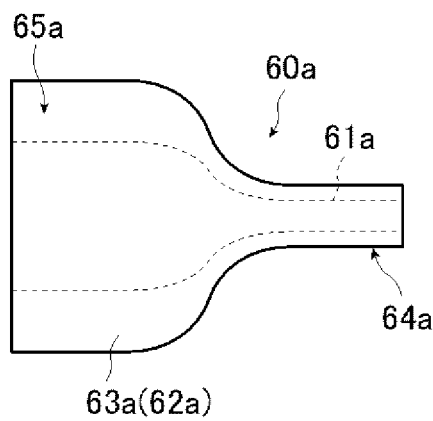
FIG. 8A to [FIG. 8E]
Figure 8D:
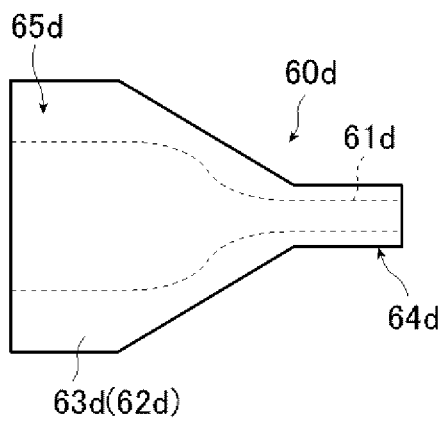
Figure 8B:
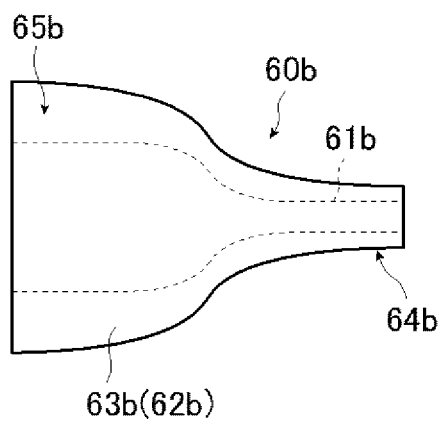
Figure 8E:
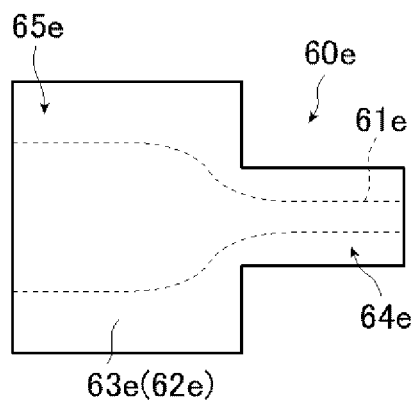
Figure 8C:
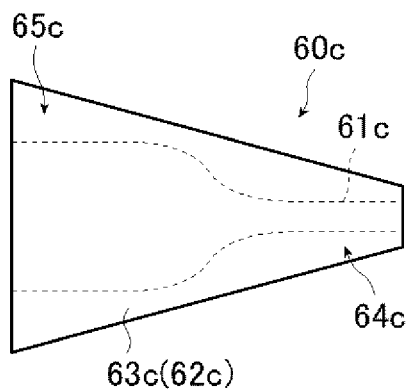

FIG. 7 is a perspective view of the polymer optical waveguide 40 illustrated in FIG. 5, but the polymer optical waveguide 40 is drawn upside down.

The polymer optical waveguide 40 illustrated in FIG. 7 has plural, specifically, eight cores 41 that are arranged parallel with each other so as to extend in the light propagation direction. These eight cores 41 satisfy the above-described conditions 1-5. Incidentally, in the polymer optical waveguide 40 illustrated in FIG. 7, the pitch of the plural cores 41 in the first section 44 is different than in the second section 45. The pitch of the plural cores 41 in the first section 44 is smaller than in the second section 45.

FIG. 8A to FIG. 8E are plan views of modified configuration examples of the polymer optical waveguide according to the present invention. Polymer optical waveguides 60a-60e illustrated in of FIG. 8A to FIG. 8E are equipped with sets of cores 61a-61e, under claddings 62a-62e, and over claddings 63a-63e, respectively. Of each of sets of cores 61a-61e, only the two outermost ones of the plural cores arranged parallel with each other so as to extend in the light propagation direction are illustrated. In the figures, illustrated on the right side are first sections 64a-64e where no portion of each of the over claddings 63a-63e exists and portions of each of the sets of cores 61a-61e and portions of each of the under claddings 62a-62e adjacent to those portions of the set of cores are exposed. In the figures, illustrated on the left side are second sections 65a-65e where the sets of cores 61a-61e are covered with the under claddings 62a-62e and the over claddings 63a-63e, respectively.

In the case where the polymer optical waveguide 40 has a rectangular plan-view shape as in the polymer optical waveguide 40 illustrated in FIG. 7, sections where only the under cladding 42 exists exist in a wide area outside the outermost cores 41 in the first section 44 where the pitch of the plural cores 41 is small. This section is not necessary because it does not contribute to light propagation at all in the polymer optical waveguide 40.

In the polymer optical waveguides 60a-60e illustrated in FIG. 8A to FIG. 8E, portions of each of the under claddings 62a-62e, located in each of the first sections 64a-64e and outside the outermost ones of each of the sets of cores 61a-61e, are removed by punching. The polymer optical waveguide having such a shape can reduce the size of a silicon chip.

A further description will be made of the polymer optical waveguide according to the present invention.

(Cores)

In the polymer optical waveguide according to the present invention, the shape of the core in the end surface s or the end surface f is not limited to a rectangle or an approximate square as illustrated. For example, the shape of the core in the end surface s or the end surface f (inside the polymer optical waveguide, the sectional shape of the core taken perpendicularly to the light propagation direction in the polymer optical waveguide) may be trapezoidal, circular, or elliptical. In the case where the shape of the core in the end surface is polygonal such as rectangular, approximately square, trapezoidal, its corners may be rounded. In the case where the shape of the core in the end surface is not rectangular or approximately square, the core width Ws and the core height Hs in the end surface s and the core width Wf and the core height Hf in the end surface f are each defined as an average core width or an average core height of a shape in the respective end surface.

The core may have a refractive index distribution inside. In this case, the refractive index distribution may be such that the refractive index decreases as the position goes away from the core center. Alternatively, the refractive index distribution may be such that the refractive index is high on the side of the over cladding and low on the side of the under cladding or such that the refractive index is low on the side of the over cladding and high on the side of the under cladding.

(Under Cladding and Over Cladding)

The refractive index is lower in the under cladding and the over cladding than in the core. Each of the under cladding and the over cladding may either have a single refractive index or be such that a portion that is close to the core and a portion that is distant from the core have different refractive indices. In the latter case, each of the under cladding and the over cladding may have either a structure that the refractive index decreases as the position goes away from the core or a structure that the refractive index increases as the position goes away from the core.

There are no particular limitations on the thicknesses of the under cladding and the over cladding. However, since propagation light leaks to a cladding portion within about 10 μm of the center of the core in the case where the polymer optical waveguide according to the present invention is a single mode optical waveguide, the thicknesses of the under cladding and the over cladding are preferably 10 m or larger from the viewpoint of decreasing the light propagation loss. The total thickness of the under cladding and the over cladding is preferably 20 μm or larger and 100 μm or smaller, and even preferably 30 m or larger and 80 μm or smaller.

(First section)

The first section of the polymer optical waveguide according to the present invention is required to have a length (in the light propagation direction) that is long enough to be used as a section for adiabatic coupling with a silicon optical waveguide. More specifically, the length of the first section, in the light propagation direction, of the polymer optical waveguide is preferably 100 μm or longer, even preferably 300 μm or longer, further preferably 500 μm or longer, and particularly preferably 1,000 μm or longer. However, in the case where the length, in the light propagation direction, of the first section of the polymer optical waveguide is too long, when the polymer optical waveguide is connected to a silicon optical waveguide by using an adhesive (e.g., epoxy resin), the connection loss may be increased by absorption by the adhesive. Thus, the length of the first section, in the light propagation direction, of the polymer optical waveguide is preferably 10,000 μm or smaller, even preferably 5,000 μm or smaller, and further preferably 3,000 μm or smaller.

(Second section)

The length of the second section is the length obtained by subtracting the length of the first section from the overall length of the polymer optical waveguide according to the present invention. Thus, there are no particular limitations on the length of the second section in the light propagation direction. However, from the viewpoints of securing necessary strength of the polymer optical waveguide, attaining low-loss propagation, realizing a polymer optical waveguide having a large number of cores, and the like, the length of the second section is preferably 1,000 μm or longer, even preferably 3,000 μm or longer and further preferably 5,000 μm or longer. On the other hand, from the viewpoints of increasing compactness, decreasing the absorption by materials, and the like, the length of the second section is preferably 35,000 μm or smaller, even preferably 20,000 μm or smaller, and further preferably 10,000 μm or smaller.

The length of the polymer optical waveguide, in the light propagation direction, according to the present invention is, for example, 1,000 μm or longer and 50,000 μm or smaller. The length of the polymer optical waveguide according to the present invention is preferably 5,000 μm or longer and 20,000 μm or smaller, and even preferably 7,000 μm or longer and 15,000 μm or smaller.

The polymer optical waveguide according to the present invention is preferably a single mode optical waveguide because it can attain low-loss propagation.

(Constituent Materials)

In the polymer optical waveguide according to the present invention, there are no particular limitations on the constituent materials of the core, the under cladding and the over cladding as long as required characteristics of the polymer optical waveguide can be obtained. However, the core being made of a polymer containing fluorine is preferable from the viewpoint of suppressing the loss of light that propagates through the core.

The under cladding and the over cladding may be made of either the same material or different materials.

(Manufacturing Method)

There are no particular limitations on the manufacturing method of the polymer optical waveguide according to the present invention and various methods can be employed. More specifically, a duplication (stumper) method, a direct exposure method, a method of combination of reactive ion etching (RIE) and a photolithography process, a method based on injection molding, a photobleaching method, a direct drawing method, and a self-written method can be used.

One example of manufacturing method of the polymer optical waveguide according to the present invention will be described.

First, an application liquid containing a curable composition (A) that is a constituent material of an under cladding is applied to a substrate by using a spin-coating method. Then an under cladding is formed by curing the curable composition (A).

Subsequently, another application liquid containing a curable composition (B) that is a constituent material of cores is applied to the under cladding by using a spin-coating method. Then the curable composition (B) is patterned by a photolithography process, whereby cores are formed on the under cladding. In this step, to form cores that are shaped so that their widths vary in the light propagation direction, cores may be formed by performing exposure using a photomask that is shaped so as to form cores whose widths vary in the light propagation direction and then performing development. If necessary, post baking may be performed after the formation of the cores.

Subsequently, another application liquid containing a curable composition (C) that is a constituent material of an over cladding is applied to the under cladding and the cores by using a spin-coating method. Then the curable composition (C) is cured, whereby an over classing is formed. In forming an over cladding, a first section in which no portion of the over cladding exists and portions of the cores and portions of the under cladding adjacent to those portions of the cores are exposed is formed by a photolithography process.

EXAMPLES

Although the present invention will be described below in more detail by referring to Examples, the present invention is not limited to these Examples. Examples 1-21 are Inventive Examples and Examples 22-36 are Comparative Examples.

A connection loss was evaluated by a simulation analysis using, as an evaluation model, a composite optical waveguide in which a polymer optical waveguide is connected to a silicon optical waveguide by adiabatic coupling on one end side and is connected to a single mode optical fiber by butt (confronting) coupling on the other end side.

A TE mode light propagation simulation was performed by a finite difference beam propagation method using optical fiber/waveguide design/analysis software "BeamPROP" (simulation engine; produced by RSoft Design Group, Inc.) that is based on a bidirectional BPM method.

FIG. 9 is a horizontal sectional view of the evaluation model that was used for the simulation analysis. The polymer optical waveguide 70 illustrated in FIG. 9 is equipped with a core 71, an under cladding 72, and an over cladding 73. A silicon optical waveguide 80 illustrated in FIG. 9 consists of a core 81 and a cladding 82. A single mode optical fiber 90 illustrated in FIG. 9 consists of a core 91 and a cladding 92.

The polymer optical waveguide 70 illustrated in FIG. 9 has, on one end side (left side in the figure) in the light propagation direction, a first section 74 where no portion of the over cladding 73 exists and a portion of the core 71 and a portion of the under cladding 72, adjacent to that portion of the core 71, are exposed. The first section 74 of the polymer optical waveguide 70 is connected to the silicon optical waveguide 80 by adiabatic coupling.

Figure 10:
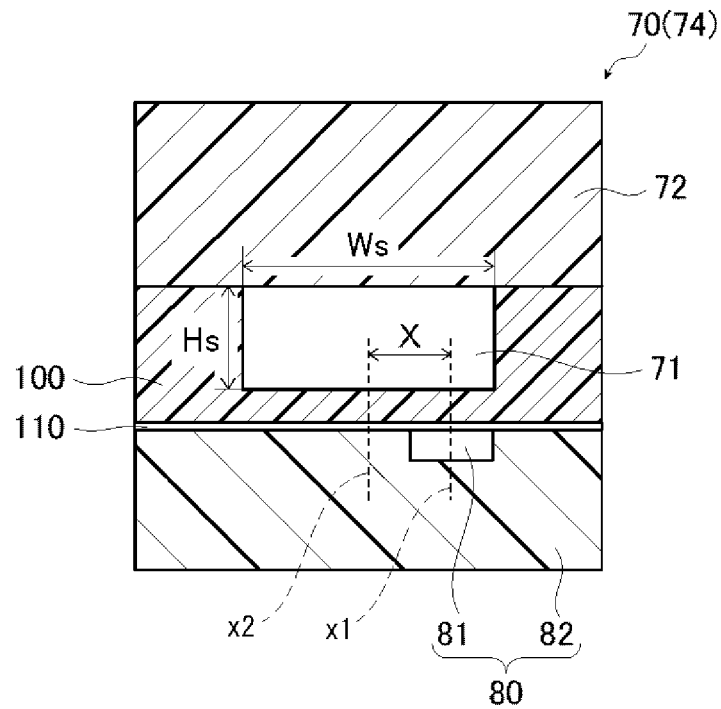
FIG. 10 is a vertical sectional view including an end surface s, located on the side of a first section 74, of an evaluation model polymer optical waveguide 70 illustrated in FIG. 9.

FIG. 10 is a vertical sectional view including an end surface s, located on the side of the first section 74, of the evaluation model polymer optical waveguide 70 illustrated in FIG. 9. As illustrated in FIG. 9, the core 71 of the polymer optical waveguide 70 and the core 81 of the silicon optical waveguide 80 are arranged so as to face each other and are joined to each other by an adhesive 100. A barrier layer 110 is formed on the surface, located on the side of the adhesive 100, of the silicon optical waveguide 80. As indicated by broken lines in FIG. 10, the centers of the core 71 of the polymer optical waveguide 70 and the core 81 of the silicon optical waveguide 80 are offset from each other; that is, the center x1 of the core 81 of the silicon optical waveguide 80 is offset from the center×2 of the core 71 of the polymer optical waveguide 70 in the horizontal direction by a distance X.

The polymer optical waveguide 70 illustrated in FIG. 9 has, on the other end side (right side in the figure) in the light propagation direction, a second section 75 where a portion of the core 71 is covered with the under cladding 72 and the over cladding 73. The second section 75 of the polymer optical waveguide 70 is connected to the single mode optical fiber 90 by confronting (butt) coupling.

Figure 11:
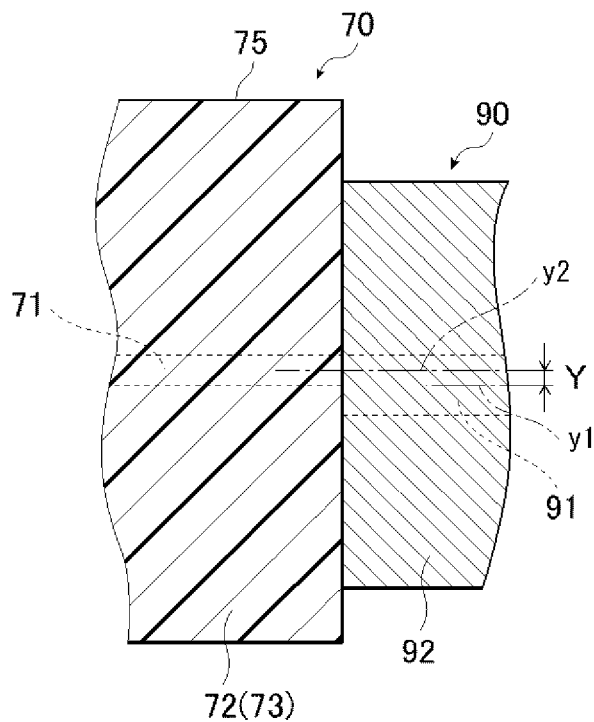
FIG. 11 is a plan view of a part around a confronting (butt) coupling portion of the evaluation model polymer optical waveguide 70 illustrated in FIG. 9 and a single mode optical fiber 90.

FIG. 11 is a plan view of a part around the confronting (butt) coupling portion of the evaluation model polymer optical waveguide 70 illustrated in FIG. 9 and the single mode optical fiber 90. As indicated by broken lines in FIG. 11, the centers of the core 71 of the polymer optical waveguide 70 and the core 91 of the single mode optical fiber 90 are offset from each other; that is, the center y1 of the core 91 of the single mode optical fiber 90 is offset from the center y2 of the core 71 of the polymer optical waveguide 70 in the horizontal direction by a distance Y.

Figure 12:
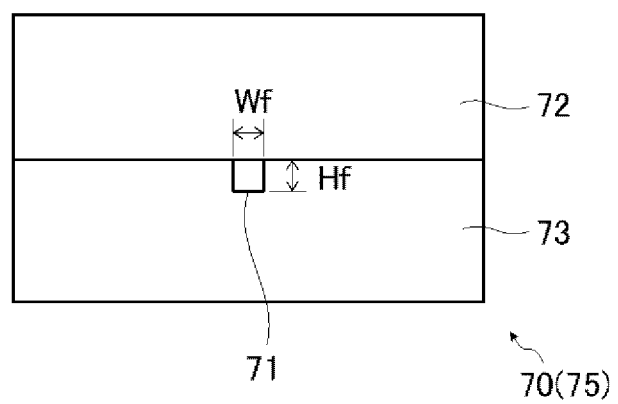
FIG. 12 is a view of an end surface f, located on the side of a second section 75, of the evaluation model polymer optical waveguide 70 illustrated in FIG. 9.

FIG. 12 is a view of an end surface f, located on the side of the second section 75, of the evaluation model polymer optical waveguide 70 illustrated in FIG. 9.

The individual structures of the evaluation model will be described below.

<Polymer optical waveguide (POW) 70>
(Core 71)
  End surface s
    Core width Ws: (As written in the tables below)
    Core height Hs: (As written in the tables below)
  End surface f
    Core width Wf: (As written in the tables below)
    Core height Hf: (As written in the tables below)
    Refractive index: (As written in the tables below)
    Length of adiabatic coupling portion 76: 1,750 μm
(Under cladding 72)
  Thickness: 15 μm
  Length: 3,050 μm
  Refractive index: (As written in the tables below)
(Over cladding 73)
  Thickness: 15 μm
  Length: 1,000 μm
  Refractive index: (As written in the tables below)
<Silicon optical waveguide (Si waveguide) 80>
(Core 81)
  Width: Decreases from 0.35 μm to 0.07 μm according to a quadratic function as the position goes from the side opposite to the polymer optical waveguide 70 toward the second section 75 of the polymer optical waveguide 70.
  Height: 0.16 μm
  Refractive index: 3.45
  Length of adiabatic coupling portion 83: 1,750 μm
  Offset distance X in horizontal direction: 0 μm (case of non-offsetting) or 2 μm (case of offsetting)
(Cladding 82)
  Thickness: 15 μm
  Refractive index: 1.45
  Length of region 84 where only cladding 82 exists: 250 μm
<Adhesive 100>
  Resin thickness (distance between confronting surfaces of core 71 of polymer optical waveguide 70 and core 81 of silicon optical waveguide 80): 0.5 μm
  Refractive index: 1.51
  Length of region 101 between silicon optical waveguide 80 and second section 75 of polymer optical waveguide 70: 50 μm
<Barrier layer 110>
  Thickness: 0.03 μm
  Refractive index: 1.989
<Single mode optical fiber (SMF) 90>
  Diameter of core 91: 8.4 μm
  Refractive index of core 91: 1.47
  Refractive index of cladding 92: 1.4652
  Offset distance Y in horizontal direction: 0 μm (case of non-offsetting) or 2 μm (case of offsetting)

As a result of the simulation analysis, a loss of the connection between the POW and the Si waveguide (the case of non-offsetting and the case of offsetting), a loss of the connection between the POW and the SMF (the case of non-offsetting and the case of offsetting), and a propagation mode were obtained. Individual sets of simulation conditions and analysis results are shown in the tables below. The term "total connection loss" is the sum of a loss of the connection between the POW and the Si waveguide and a loss of the connection between the POW and the SMF. In the tables below, the loss of the connection between the POW and the Si waveguide in the case of non-offsetting is referred to as a "Connection loss (Si waveguide)," the loss of the connection between the POW and the Si waveguide in the case of offsetting is referred to as an "Offset connection loss (Si waveguide)," the loss of the connection between the POW and the SMF in the case of non-offsetting is referred to as a "Connection loss (SMF)," the loss of the connection between the POW and the SMF in the case of offsetting is referred to as an "Offset connection loss (SMF)," the total connection loss in the case of non-offsetting is referred to as a "Connection loss (total)," and a total connection loss in the case of offsetting is referred to as an "Offset connection loss (total)."

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Refractive index (core) | 1.53 | 1.53 | 1.53 | 1.53 | 1.53 | 1.53 | 1.53 | 1.53 |
| Refractive index (under cladding) | 1.521 | 1.519 | 1.518 | 1.516 | 1.515 | 1.513 | 1.512 | 1.512 |
| Refractive index (over cladding) | 1.521 | 1.519 | 1.518 | 1.516 | 1.515 | 1.513 | 1.512 | 1.512 |
| Core-cladding relative refractive index difference D (%) | 0.6 | 0.7 | 0.8 | 0.9 | 1.0 | 1.1 | 1.2 | 1.2 |
| Core height Hs (μm) | 2.0 | 2.0 | 2.0 | 2.0 | 2.0 | 2.0 | 2.0 | 2.0 |
| Core width Ws (μm) | 8.0 | 6.0 | 6.0 | 6.0 | 4.0 | 4.0 | 4.0 | 4.0 |
| Ws/Hs | 4.00 | 3.00 | 3.00 | 3.00 | 2.00 | 2.00 | 2.00 | 2.00 |
| Connection loss (Si waveguide) (dB) | 0.86 | 0.50 | 0.27 | 0.17 | 0.14 | 0.12 | 0.12 | 0.12 |
| Offset connection loss (Si waveguide) (dB) | 1.04 | 0.70 | 0.35 | 0.20 | 0.28 | 0.19 | 0.16 | 0.16 |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Core height Hf (μm) | 2.0 | 2.0 | 2.0 | 2.0 | 2.0 | 2.0 | 2.0 | 2.0 |
| Core width Wf (μm) | 4.0 | 4.0 | 2.0 | 2.0 | 2.0 | 1.5 | 2.0 | 1.5 |
| k | 9.0 | 9.5 | 8.0 | 8.5 | 9.0 | 9.0 | 10.0 | 9.5 |
| Ws/Wf | 2.00 | 1.50 | 3.00 | 3.00 | 2.00 | 2.67 | 2.00 | 2.67 |
| Wf + Hf (μm) | 6.0 | 6.0 | 4.0 | 4.0 | 4.0 | 3.5 | 4.0 | 3.5 |
| Connection loss (SMF) (dB) | 0.20 | 0.34 | 0.27 | 0.29 | 0.40 | 0.30 | 0.80 | 0.38 |
| Offset connection loss (SMF) (dB) | 1.02 | 1.25 | 1.05 | 1.12 | 1.31 | 1.12 | 2.09 | 1.27 |
| Connection loss (total) (dB) | 1.06 | 0.84 | 0.57 | 0.46 | 0.53 | 0.42 | 0.92 | 0.50 |
| Offset connection loss (total) (dB) | 2.07 | 1.95 | 1.40 | 1.31 | 1.59 | 1.32 | 2.25 | 1.43 |
| Propagation mode | single | single | single | single | single | single | single | single |

TABLE 2

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Refractive index (core) | 1.53 | 1.53 | 1.53 | 1.53 | 1.53 | 1.53 | 1.53 | 1.53 |
| Refractive index (under cladding) | 1.510 | 1.509 | 1.507 | 1.506 | 1.504 | 1.518 | 1.516 | 1.519 |
| Refractive index (over cladding) | 1.510 | 1.509 | 1.507 | 1.506 | 1.504 | 1.518 | 1.516 | 1.519 |
| Core-cladding relative refractive index difference D (%) | 1.3 | 1.4 | 1.5 | 1.6 | 1.7 | 0.8 | 0.9 | 0.7 |
| Core height Hs (μm) | 1.5 | 1.5 | 1.5 | 1.5 | 1.5 | 2.0 | 2.0 | 2.0 |
| Core width Ws (μm) | 4.0 | 4.0 | 4.0 | 4.0 | 4.0 | 4.0 | 4.0 | 6.0 |
| Ws/Hs | 2.67 | 2.67 | 2.67 | 2.67 | 2.67 | 2.00 | 2.00 | 3.00 |
| Connection loss (Si waveguide) (dB) | 0.23 | 0.30 | 0.37 | 0.46 | 0.54 | 0.53 | 0.22 | 0.50 |
| Offset connection loss (Si waveguide) (dB) | 0.22 | 0.28 | 0.37 | 0.45 | 0.53 | 1.04 | 0.48 | 0.70 |
| Core height Hf (μm) | 1.5 | 1.5 | 1.5 | 1.5 | 1.5 | 2.0 | 2.0 | 2.0 |
| Core width Wf (μm) | 1.5 | 1.5 | 1.5 | 1.5 | 1.5 | 2.0 | 2.0 | 2.0 |
| k | 9.5 | 10.0 | 10.5 | 11.0 | 11.5 | 8.0 | 8.5 | 7.5 |
| Ws/Wf | 2.67 | 2.67 | 2.67 | 2.67 | 2.67 | 2.00 | 2.00 | 3.00 |
| Wf + Hf (μm) | 3.0 | 3.0 | 3.0 | 3.0 | 3.0 | 4.0 | 4.0 | 4.0 |
| Connection loss (SMF) (dB) | 0.30 | 0.35 | 0.44 | 0.58 | 0.75 | 0.30 | 0.29 | 0.55 |
| Offset connection loss (SMF) (dB) | 1.09 | 1.18 | 1.34 | 1.51 | 1.73 | 1.05 | 1.12 | 1.19 |
| Connection loss (total) (dB) | 0.54 | 0.65 | 0.81 | 1.04 | 1.29 | 0.83 | 0.51 | 1.05 |
| Offset connection loss (total) (dB) | 1.31 | 1.47 | 1.71 | 1.96 | 2.25 | 2.09 | 1.60 | 1.90 |
| Propagation mode | single | single | single | single | single | single | single | single |

TABLE 3

|  | Ex. 17 | Ex. 18 | Ex. 19 | Ex. 20 | Ex. 21 |
|---|---|---|---|---|---|
| Refractive index (core) | 1.53 | 1.53 | 1.53 | 1.53 | 1.53 |
| Refractive index (under cladding) | 1.518 | 1.516 | 1.513 | 1.521 | 1.510 |
| Refractive index (over cladding) | 1.518 | 1.516 | 1.513 | 1.521 | 1.510 |
| Core-cladding relative refractive index difference D (%) | 0.8 | 0.9 | 1.1 | 0.6 | 1.3 |
| Core height Hs (μm) | 1.5 | 3.0 | 1.2 | 2.0 | 1.3 |
| Core width Ws (μm) | 7.5 | 4.5 | 7.0 | 8.0 | 5.5 |
| Ws/Hs | 5.00 | 1.50 | 5.83 | 4.00 | 4.23 |
| Connection loss (Si waveguide) (dB) | 0.50 | 0.22 | 0.55 | 0.86 | 0.27 |
| Offset connection loss (Si waveguide) (dB) | 0.49 | 1.18 | 0.59 | 1.04 | 0.27 |
| Core height Hf (μm) | 1.5 | 3.0 | 1.2 | 2.0 | 1.3 |
| Core width Wf (μm) | 3.0 | 1.0 | 2.5 | 6.5 | 1.3 |
| k | 8.5 | 8.5 | 9.2 | 11.5 | 9.1 |
| Ws/Wf | 2.50 | 4.50 | 2.80 | 1.23 | 4.23 |
| Wf + Hf (μm) | 4.5 | 4.0 | 3.7 | 8.5 | 2.6 |
| Connection loss (SMF) (dB) | 0.24 | 0.69 | 0.27 | 0.26 | 0.91 |
| Offset connection loss (SMF) (dB) | 1.03 | 1.31 | 1.08 | 1.10 | 1.51 |
| Connection loss (total) (dB) | 0.74 | 0.91 | 0.82 | 1.12 | 1.18 |
| Offset connection loss (total) (dB) | 1.52 | 2.49 | 1.67 | 2.14 | 1.78 |
| Propagation mode | single | single | single | single | single |

TABLE 4

|  | Ex. 22 | Ex. 23 | Ex. 24 | Ex. 25 | Ex. 26 | Ex. 27 | Ex. 28 | Ex. 29 |
|---|---|---|---|---|---|---|---|---|
| Refractive index (core) | 1.53 | 1.53 | 1.53 | 1.53 | 1.53 | 1.53 | 1.53 | 1.53 |
| Refractive index (under cladding) | 1.521 | 1.519 | 1.518 | 1.516 | 1.516 | 1.503 | 1.521 | 1.522 |

TABLE 4-continued

|  | Ex. 22 | Ex. 23 | Ex. 24 | Ex. 25 | Ex. 26 | Ex. 27 | Ex. 28 | Ex. 29 |
|---|---|---|---|---|---|---|---|---|
| Refractive index (over cladding) | 1.521 | 1.519 | 1.518 | 1.516 | 1.516 | 1.503 | 1.521 | 1.522 |
| Core-cladding relative refractive index difference D (%) | 0.6 | 0.7 | 0.8 | 0.9 | 0.9 | 1.8 | 0.6 | 0.5 |
| Core height Hs (μm) | 4.0 | 4.0 | 4.0 | 4.0 | 4.0 | 1.5. | 2.0 | 4.0 |
| Core width Ws (μm) | 4.0 | 4.0 | 4.0 | 4.0 | 4.0 | 4.0 | 6.0 | 6.0 |
| Ws/Hs | 1.00 | 1.00 | 1.00 | 1.00 | 1.00 | 2.67 | 3.00 | 1.50 |
| Connection loss (Si waveguide) (dB) | 0.90 | 0.63 | 0.48 | 0.38 | 0.38 | 0.64 | 1.29 | 1.57 |
| Offset connection loss (Si waveguide) (dB) | 3.94 | 3.38 | 3.04 | 2.80 | 2.80 | 0.62 | 2.10 | 3.26 |
| Core height Hf (μm) | 4.0 | 4.0 | 4.0 | 4.0 | 4.0 | 1.5. | 2.0 | 4.0 |
| Core width Wf (μm) | 2.0 | 2.0 | 2.0 | 2.0 | 4.0 | 1.5. | 2.0 | 2.0 |
| k | 9.0 | 9.5 | 10.0 | 10.5 | 12.5 | 12.0 | 7.0 | 8.5 |
| Ws/Wf | 2.00 | 2.00 | 2.00 | 2.00 | 1.00 | 2.67 | 3.00 | 3.00 |
| Wf + Hf (μm) | 6.0 | 6.0 | 6.0 | 6.0 | 8.0 | 3.0 | 4.0 | 6.0 |
| Connection loss (SMF) (dB) | 0.20 | 0.33 | 0.54 | 0.76 | 1.11 | 0.95 | 1.34 | 0.25 |
| Offset connection loss (SMF) (dB) | 1.06 | 1.28 | 1.56 | 1.86 | 2.26 | 1.96 | 1.89 | 1.00 |
| Connection loss (total) (dB) | 1.10 | 0.96 | 1.01 | 1.14 | 1.50 | 1.58 | 2.63 | 1.82 |
| Offset connection loss (total) (dB) | 5.00 | 4.66 | 4.60 | 4.66 | 5.06 | 2.58 | 3.99 | 4.26 |
| Propagation mode | single | single | single | single | single | single | single | single |

TABLE 5

|  | Ex. 30 | Ex. 31 | Ex. 32 | Ex. 33 | Ex. 34 | Ex. 35 | Ex. 36 |
|---|---|---|---|---|---|---|---|
| Refractive index (core) | 1.53 | 1.53 | 1.53 | 1.53 | 1.53 | 1.53 | 1.53 |
| Refractive index (under cladding) | 1.518 | 1.518 | 1.512 | 1.513 | 1.513 | 1.513 | 1.513 |
| Refractive index (over cladding) | 1.518 | 1.518 | 1.512 | 1.513 | 1.513 | 1.513 | 1.513 |
| Core-cladding relative refractive index difference D (%) | 0.8 | 0.8 | 1.2 | 1.1 | 0.9 | 1.3 | 1.1 |
| Core height Hs (μm) | 1.0 | 2.0 | 2.0 | 2.0 | 1.5 | 1.0 | 4.0 |
| Core width Ws (μm) | 8.0 | 2.0 | 4.0 | 2.0 | 2.5 | 4.0 | 4.0 |
| Ws/Hs | 8.00 | 1.00 | 2.00 | 1.00 | 1.67 | 4.00 | 1.00 |
| Connection loss (Si waveguide) (dB) | 7.72 | 34.64 | 0.12 | 0.64 | 18.65 | 0.75 | 0.31 |
| Offset connection loss (Si waveguide) (dB) | 8.72 | 41.84 | 0.16 | 1.13 | 27.79 | 0.74 | 2.50 |
| Core height Hf (μm) | 1.0 | 2.0 | 2.0 | 2.0 | 1.5 | 1.0 | 4.0 |
| Core width Wf (μm) | 3.5 | 2.0 | 4.0 | 2.0 | 2.5 | 1.5 | 4.0 |
| k | 8.5 | 8.0 | 12.0 | 9.5 | 8.5 | 9.0 | 13.5 |
| Ws/Wf | 2.29 | 1.00 | 1.00 | 1.00 | 1.00 | 2.67 | 1.00 |
| Wf + Hf (μm) | 4.5 | 4.0 | 6.0 | 4.0 | 4.0 | 2.5 | 8.0 |
| Connection loss (SMF) (dB) | 0.72 | 0.30 | 1.47 | 0.58 | 0.26 | 1.84 | 1.48 |
| Offset connection loss (SMF) (dB) | 1.31 | 1.05 | 2.62 | 1.82 | 1.05 | 2.35 | 1.93 |
| Connection loss (total) (dB) | 8.44 | 34.95 | 1.59 | 1.22 | 18.91 | 2.59 | 1.80 |
| Offset connection loss (total) (dB) | 10.03 | 42.88 | 2.78 | 2.95 | 28.84 | 3.08 | 4.43 |
| Propagation mode | single | single | single | single | single | single | multi |

The total connection loss in the case of the offset of 2μm was 2.50 dB or smaller and the propagation mode was a single mode in each of Examples 1-21 in which k was 7.5 or larger and 11.5 or smaller, Ws/Hs was 1.50 or larger and 6.00 or smaller, Ws/Wf is 1.20 or larger, Wf+Hf is 2.6 or larger, and D was 0.6 or larger. On the other hand, the total connection loss in the case of the offset of 2μm was larger than 2.50 dB in each of: Examples 22-25 in which Ws/Hs was smaller than 1.50; Example 26 in which k was larger than 11.5, Ws/Hs was smaller than 1.50 and Ws/Wf was smaller than 1.20; Example 27 in which k was larger than 11S; Example 28 in which k was smaller than 7.5; Example 29 in which the relative refractive index difference D was smaller than 0.60%; Example 30 in which Ws/Hs was larger than 6.00; Example 31 in which Ws/Hs was smaller than 1.50 and Ws/Wf was smaller than 1.20; Example 32 in which k was larger than 11.5 and Ws/Wf was smaller than 1.20; Example 33 in which Ws/Hs was smaller than 1.50 and Ws/Wf was smaller than 1.20; Example 34 in which Ws/Wf was smaller than 1.20; Example 35 in which Wf+Hf was smaller than 2.6; and Example 36 in which Ws/Hs was smaller than 1.50 and k was larger than 11.5. In Example 36, the propagation mode was a multimode and propagation loss was large.

Although the present invention has been described in detail by referring to the particular embodiments, it is apparent to those skilled in the art that various changes and modifications can be made without departing from the spirit and scope of the present invention. The present application is based on Japanese Patent Application No. 2019-088978 filed on May 9, 2019, the entire disclosure of which is invoked herein by reference.

DESCRIPTION OF SYMBOLS

10: Polymer optical waveguide
11a, 11b: Core
12: Under cladding
13: Over cladding
14: First section
15: Second section
20: Composite optical waveguide
30: Silicon optical waveguide
40: Polymer optical waveguide
41: Core
42: Under cladding
43: Over cladding
44: First section
45: Second section
50: Connector
60a, 60b, 60c, 60d, 60e: Polymer optical waveguide
61a, 61b, 61c, 61d, 61e: Core
62a, 62b, 62c, 62d, 62e: Under cladding
63a, 63b, 63c, 63d, 63e: Over cladding
64a, 64b, 64c, 64d, 64e: First section
65a, 65b, 65c, 65d, 65e: Second section
70: Polymer optical waveguide
71: Core
72: Under cladding
73: Over cladding
74: First section
75: Second section
76: Adiabatic coupling portion
80: Silicon optical waveguide
81: Core
82: Cladding
83: Adiabatic coupling portion
84: Region where only cladding exists
90: Single mode optical fiber
91: Core
92: Cladding
100: Adhesive
101: Region between silicon optical waveguide and second section of polymer optical waveguide
110: Barrier layer
x1, x2, y1, y2: Center
X, Y: Offset distance

What is claimed is:

1. A polymer optical waveguide comprising a core, an under cladding that is lower in refractive index than the core and is located adjacent to the core, and an over cladding that is located adjacent to the core on the side opposite to the under cladding,
wherein
the polymer optical waveguide has a first section and a second section along a light propagation direction, the first section is a section on one end side in the light propagation direction where no portion of the over cladding exists and a portion of the core and a portion of the under cladding adjacent to that portion of the core are exposed, and the second section is a section on the other end side in the light propagation direction where a portion of the core is covered with the under cladding and the over cladding;
a relative refractive index difference D (%) defined by the following Equation (i) is 0.6 or larger;
k defined by the following Equation (ii) is 7.5 or larger and 11.5 or smaller;
Ws/Hs is 1.50 or larger and 6.00 or smaller;
Ws/Wf is 1.20 or larger; and
Wf+Hf is 2.6 or larger:

$$D(\%)=100\times[(\text{core refractive index})-\{(\text{under cladding refractive index})+(\text{over cladding refractive index})\}/2]/[\{(\text{under cladding refractive index})+(\text{over cladding refractive index})\}/2] \quad \text{Equation (i)}$$

$$k=5D+Wf+Hf \quad \text{Equation (ii)}$$

where
Ws (μm) is a core width in an end surface s at the one end side of the first section,
Hs (m) is a core height in the end surface s,
Wf (μm) is a core width in an end surface f at the other end side of the second section, and
Hf (μm) is a core height in the end surface f.

2. The polymer optical waveguide according to claim 1, wherein the relative refractive index difference D is 0.6 or larger and 1.7 or smaller.

3. The polymer optical waveguide according to claim 1, wherein Ws/Wf is 1.20 or larger and 10.00 or smaller.

4. The polymer optical waveguide according to claim 1, wherein Wf+Hf is 2.6 or larger and 8.5 or smaller.

5. The polymer optical waveguide according to according to claim 1, wherein the core comprises a polymer comprising fluorine.

6. The polymer optical waveguide according to claim 1, wherein the polymer optical waveguide is a single mode optical waveguide.

7. A composite optical waveguide comprising the polymer optical waveguide described in claim 1 and a connector that houses the second section of the polymer optical waveguide.

8. The polymer optical waveguide according to claim 1, wherein Ws/Hs is 1.80 or larger and 6.00 or smaller.

9. The polymer optical waveguide according to claim 1, wherein the polymer optical waveguide comprises a plurality of cores that extend parallel to each other along the light propagation direction in the first section and in the second section.

10. The polymer optical waveguide according to claim 9, wherein the plurality of cores has a smaller pitch in the first section than in the second section.

* * * * *